United States Patent
Cheng

[11] Patent Number: 6,090,275
[45] Date of Patent: Jul. 18, 2000

[54] LIQUID FILTER WITH DENSITY ADJUSTABLE FILTER ELEMENT MEANS

[76] Inventor: Danny Kwei Cheng, 1F, 10 Alley 21, Lane 69, Sec. 5, Mingsheng E. Rd., Taipei, Taiwan

[21] Appl. No.: 09/227,765

[22] Filed: Jan. 8, 1999

[51] Int. Cl.[7] .............................. B01D 33/00; B01D 33/44
[52] U.S. Cl. ........................... 210/90; 210/351; 210/411; 210/450; 210/455; 210/497.01
[58] Field of Search .......................... 210/90, 108, 323.2, 210/348, 350, 351, 359, 386, 409, 411, 446, 450, 455, 496, 497.01, 503; 55/422

[56] References Cited

U.S. PATENT DOCUMENTS

| 224,471 | 2/1880 | Moore . |
| 519,565 | 5/1894 | Bommarius . |
| 4,776,962 | 10/1988 | Wakeman . |
| 4,851,136 | 7/1989 | Fanqing et al. . |
| 4,937,005 | 6/1990 | Shelstad . |
| 5,984,108 | 11/1999 | Choi . |

Primary Examiner—W. L. Walker
Assistant Examiner—Terry K. Cecil
Attorney, Agent, or Firm—Rosenberg, Klein & Lee

[57] ABSTRACT

A liquid filter includes a barrel defining a cylindrical water chamber having a neck at the middle, a raw water inlet at the bottom side, and a clean water outlet at the top side, a suspension board suspended in the water chamber, a pneumatic cylinder operated to reciprocate pressure means through the suspension board in and out of the neck of in cylindrical water chamber, bundles of fibers respectively suspended from the suspension board for removing solid matter from upward flow of water passing through, a weight board connected to the bundles of fibers and suspended in the water chamber below the neck, and a fabric filter suspended in the water chamber below the weight board, wherein the sizes of the filtering open spaces in the bundles of fibers are reduced when the pressure means is lowered into the neck; the sizes of the filtering open spaces in the bundles of fibers are expanded when the pressure means is lifted away from the neck.

7 Claims, 4 Drawing Sheets

LIQUID FILTER WITH DENSITY ADJUSTABLE FILTER ELEMENT MEANS

BACKGROUND OF THE INVENTION

The present invention relates to a liquid filter and more particularly to such a liquid filter which uses density-adjustable bundles of fibers to remove solid matter from water.

A variety of liquid filters have been disclosed, using a fiber filter element to remove solid matter from water. The density of the fiber filter element has a great concern with its filtering effect, i.e., the smaller the open spaces in the fiber filter element are, the better the filtering effect will be. However, it is difficult to clean a high density fiber filter element.

SUMMARY OF THE INVENTION

The present invention has been accomplished to provide a liquid filter which eliminates the aforesaid problem. It is one object of the present invention to provide a liquid filter which uses a density adjustable filter element to remove solid matter from water. It is another object of the present invention to provide a liquid filter that can easily be washed. To achieve these and other objects of the present invention, there is provided a liquid filter comprised of a barrel defining a cylindrical water chamber having a neck on the middle, a raw water inlet at the bottom side, and clean water outlet at the top e, a suspension board suspended in the water chamber, a pneumatic cylinder operated to reciprocate pressure means through the suspension board in and out of the neck of in cylindrical water chamber, bundles of fibers respectively suspended from the suspension board for removing solid matter from upward flow of water passing through, a weight board connected to the bundles of fibers and suspended in the water chamber below the neck, and a fabric filter suspended in the water chamber below the weight board. The bundles of fibers are radially squeezed outwards by the pressure means when the pressure means is lowered into the neck, causing the density of said filter element to be increased.

DETAILED DESCRIPTION OF THE PREFERRED EMBODIMENT

Figure 1:
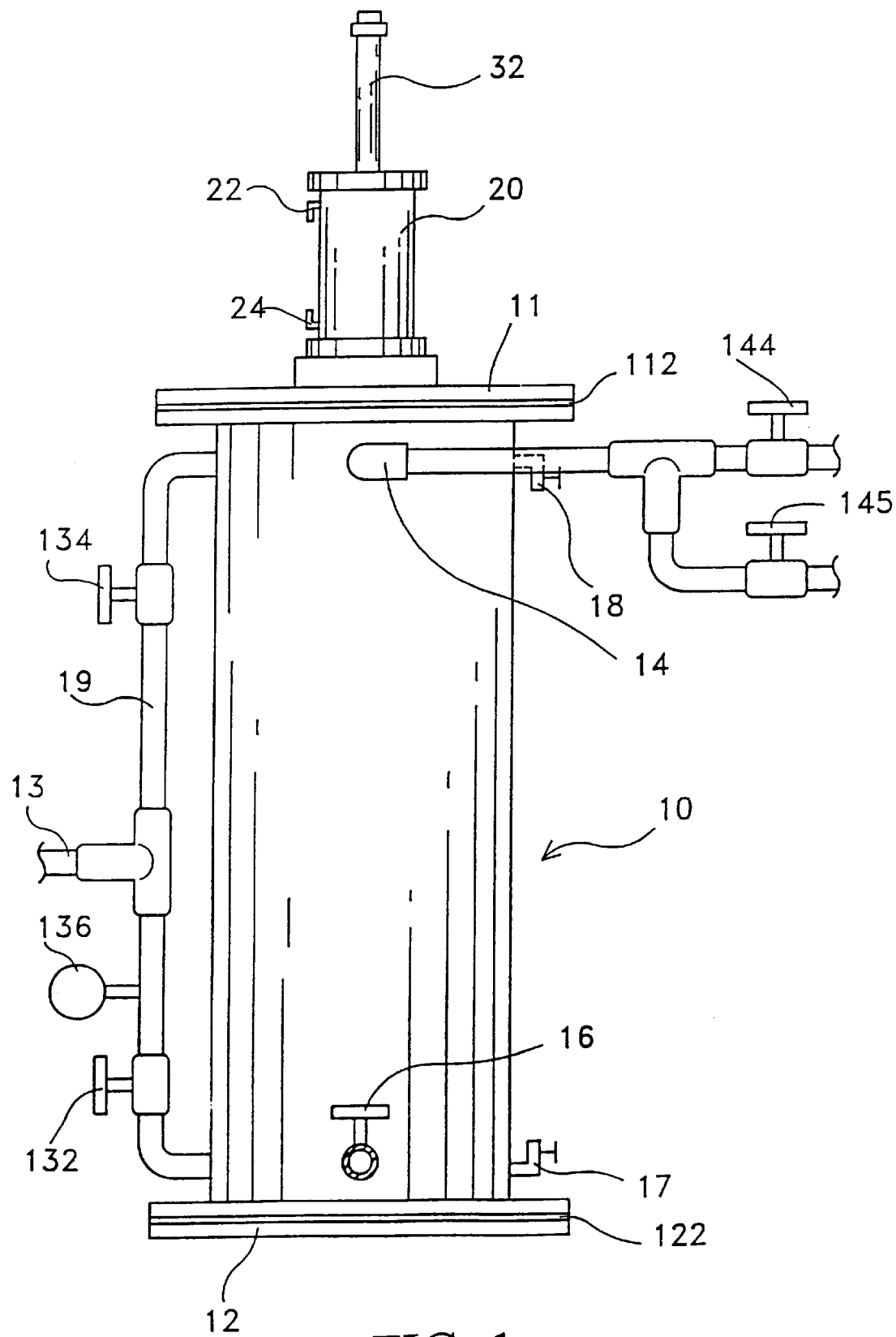
FIG. 1 illustrates the outer appearance of a liquid filter according to the present invention.

Referring to FIG. 1, a liquid filter in accordance with the present invention comprises a hollow barrel 10. A top cover plate 11 and a bottom cover plate 12 are respectively securely covered on top and bottom ends of the hollow barrel 10. A first sealing pad 112 is securely sealed between the top end of the barrel 10 and the top cover plate 11. A second sealing pad 122 is securely sealed between the bottom end of the barrel 10 and the bottom cover plate 12. An pneumatic cylinder 20 is securely mounted on the top cover plate 11 at the top side. The pneumatic cylinder 20 has an upper air hole 22 and a lower air hole 24 respectively disposed at the periphery near its top and bottom ends. A vertical water pipe 19 is provided at one side of the barrel 10. The water pipe 19 has two opposite ends respectively connected to the periphery of the barrel 10 near the top and bottom ends of the barrel 10. A water inlet pipe 13 is connected to a middle part of the vertical water pipe 19 for guiding water into the barrel 10. A reverse wash water input control valve 134 is installed in the vertical water pipe 19 above the elevation of the water inlet pipe 13. A pressure gauge 136 and a raw water input control valve 132 are disposed on the vertical water pipe 19 below the elevation of the water inlet pipe 13. A clean water outlet pipe 14 and a reverse wash air input control valve 18 are respectively provided at the periphery of the barrel 10 near the top. A clean water output control valve 144 and a forward wash water output control valve 145 are connected in parallel to the clean water outlet pipe 14. A reverse wash water output control valve 16 and a forward wash air inlet pipe 17 are respectively disposed on the periphery of the barrel 10 near the bottom end of the barrel 10.

Figure 2:
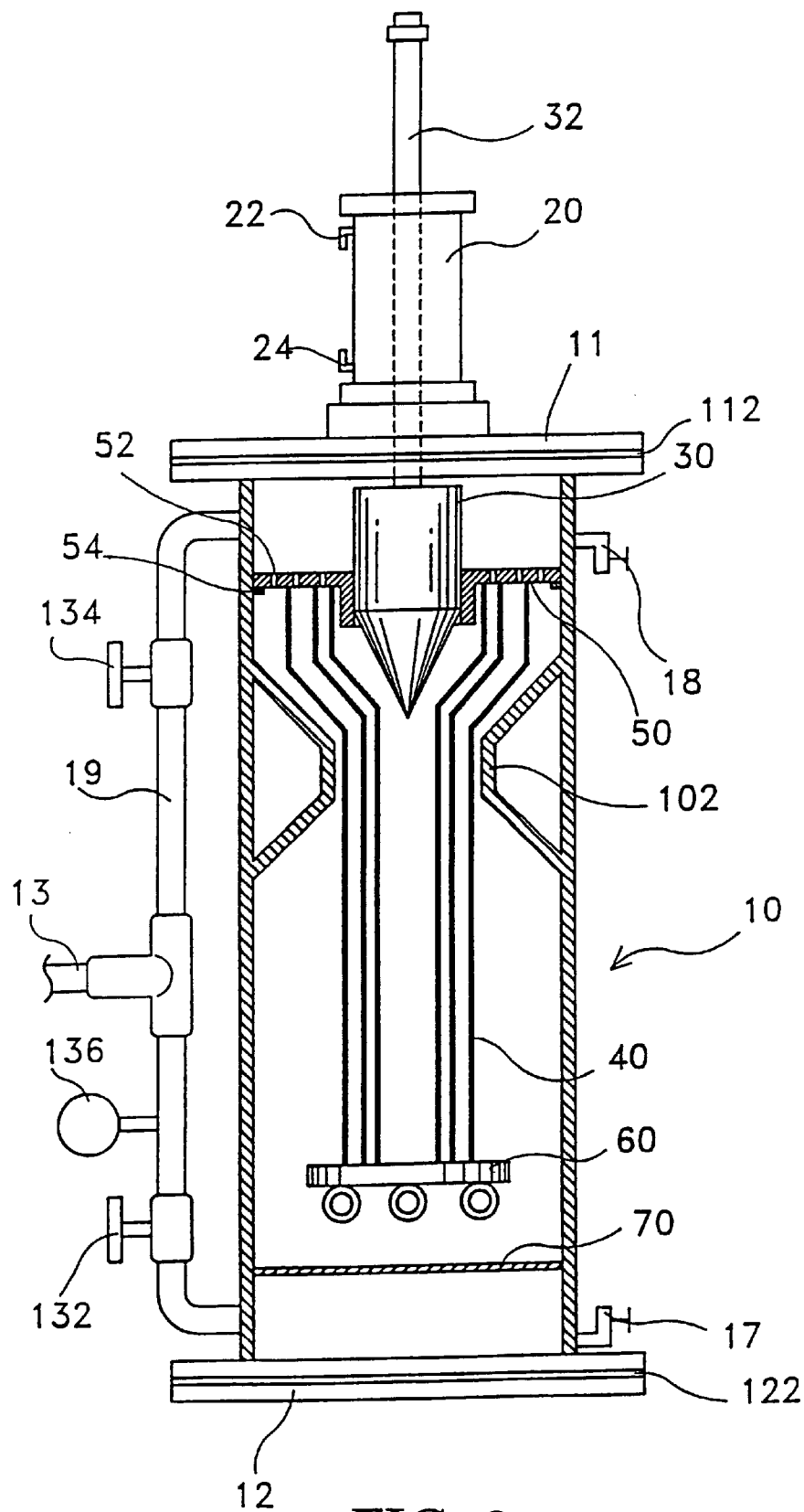
FIG. 2 is a sectional view of the liquid filter shown in FIG. 1.

Referring to FIG. 2, the pneumatic cylinder 20 comprises a piston rod 32, which is inserted through (a through hole at) the center of the top cover plate 11 and (a through hole at) the center of the first sealing pad 112 into the barrel 10. A pressure cone 30 is fixedly connected to one end namely the bottom end of the piston rod 32, and moved up and down with the piston rod 32 in the barrel 10. The barrel 10 comprises an annular inside flange 54 near the top below the elevation of the top end of the vertical water pipe 19 and the reverse wash air input control valve 18. A perforated circular suspension board 50 is mounted inside the barrel 10, and supported on the annular inside flange 54. The perforated circular suspension board 50 has a plurality of locating holes 52. A filter filter element, namely, bundles of fibers 40 are respectively fastened to the locating holes 52, and suspended from the circular suspension board 50 in the barrel 10. The bundles of fibers 40 pass through a neck 102 in the inner diameter (cylindrical water chamber) of the barrel 10, having respective bottom ends respectively connected to a weight board 60. The diameter of the neck 102 is greater than the diameter of the pressure cone 30. Further, the suspension board 50 has a circular center hole (not shown) through which the pressure cone 30 is moved with the piston rod 32 into the space defined within the neck 102. The weight board 60 is fastened to the bottom ends of the bundles of fibers 40, and horizontally suspended in the barrel 10. A fabric filter 70 is suspended in the barrel 10 below the weight board 60 and above the elevation of the forward wash air inlet pipe 17 and the bottom end of the vertical water pipe 19.

Figure 3:
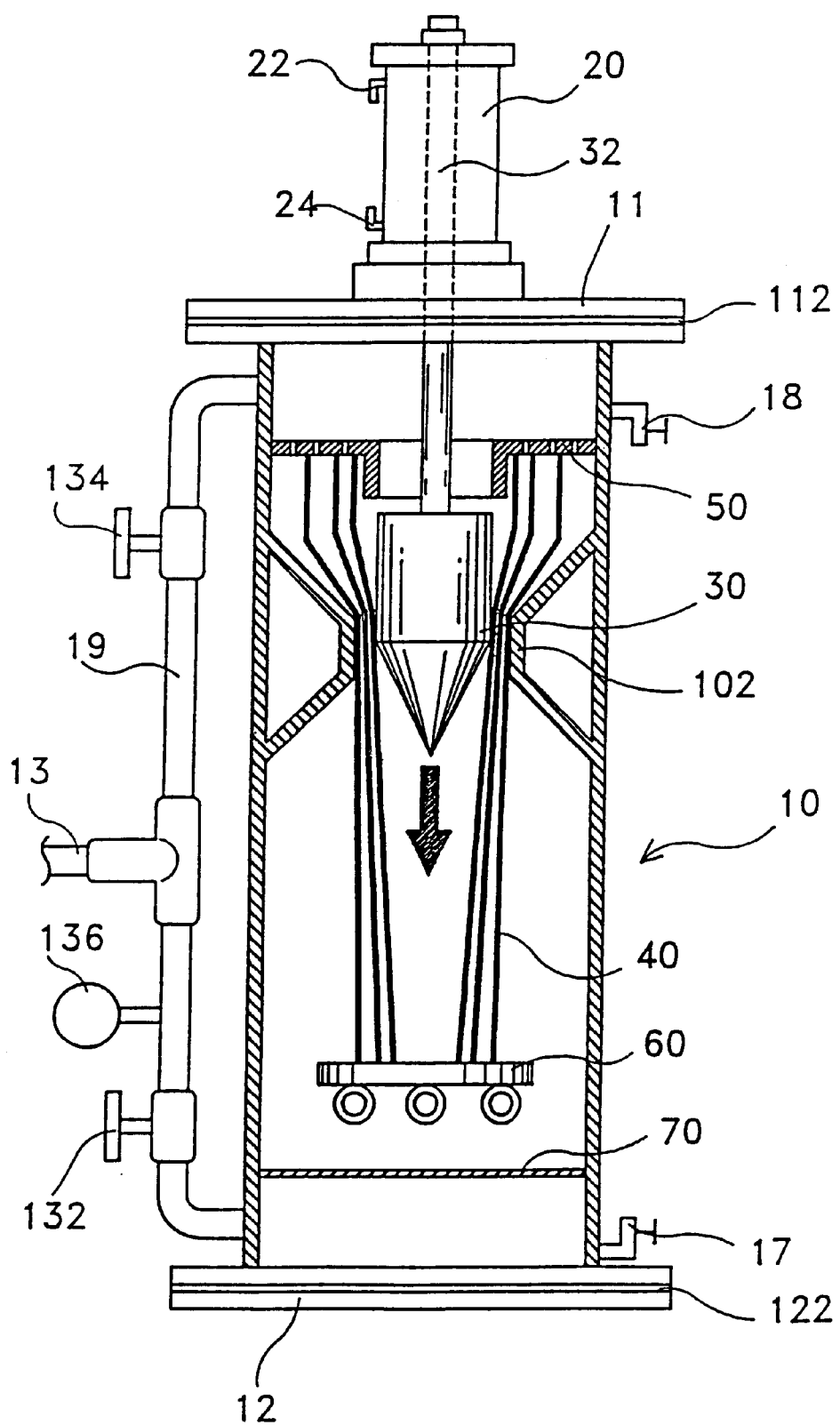
FIG. 3 is similar to FIG. 2 but showing the pressure cone lowered with the piston rod, the bundles of fibers squeezed outwards against the peripheral wall of the neck.

Referring to FIG. 3 and FIGS. 1 and 2 again, when filtering raw water, all control valves are closed, then compressed air is guided into the upper air hole 22 to force down the piston rod 32 (the piston rod is fixedly mounted with a piston moved up and down within the cylindrical shell of the pneumatic cylinder 20 between the elevation of the upper air hole 22 and the elevation of the lower air hole 24), thereby causing the pressure cone 30 to be lowered with the piston rod 32 into the neck 30 (see FIG. 3), and therefore the bundles of the fibers 40 are radially outwardly squeezed against the peripheral wall of the neck 102 and, the sizes of the open spaces in the bundles of fibers 40 are minimized, and then the raw water input control valve 132 and the clean water output control valve 144 are opened, enabling raw water to be pumped through the water inlet pipe 13 and the raw water input control valve 132 into the barrel 10, and continuously forced upwards through the fabric filter 70 and the open spaces in the bundles of fibers 40 and the circular suspension board 50 toward the clean water output control valve 144.

Referring to FIGS. from 1 through 3 again, when the bundles of fibers 40 are adhered with solid matter to a saturated state, the indication of the pressure gauge 136 surpasses a predetermined value, and the liquid filter must be well cleaned. When cleaning the liquid filter, the reverse wash water output control valve 16 and the reverse wash water input control valve 134 are opened and the raw water input control valve 132 and the clean water output control valve 144 are closed, then compressed air is allowed into the lower air hole 23 to force the piston rod 32 upwards, thereby causing the pressure cone 30 to be moved upwards with the piston rod 32 away from the neck 30 and released from the bundles of fibers 40 (see FIG. 2), and then the reverse wash air input control valve 18, enabling compressed air and raw water to be guided into the barrel 10 from the top side toward the bottom side. Therefore, solid matter is carried away from the bundles of fibers 40 with downward flow of raw water and compressed air, expelled out of the barrel 10 through the reverse wash water output control valve 16. About 15~20 minutes after a forward wash, the forward wash water output control valve 145 and the raw water input control valve 132 are opened, the reverse wash water input control valve 134, the reverse wash water output control valve 16 and the reverse wash air input control valve 18 are closed, and then the forward wash water input control valve 17 is opened, enabling solid matter (pollutant) to be moved with compressed air and water through the bottom side through the fabric filter 70, the neck 102 and the circular suspension board 50 toward the forward wash water output control valve 145. 10~15 minutes after wash, the washing process is done, and the liquid filter can be used to filter raw water again.

Figure 4A:
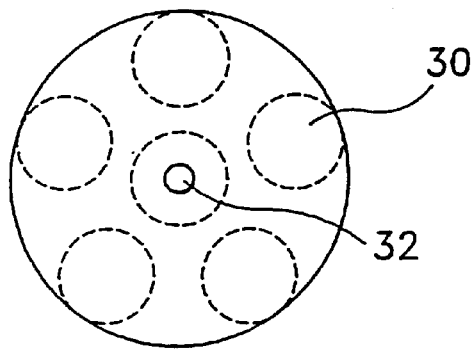
FIG. 4A is a top plain view of a part of FIG. 4, showing the pressure cones connected in parallel to the piston rod.
Figure 4:
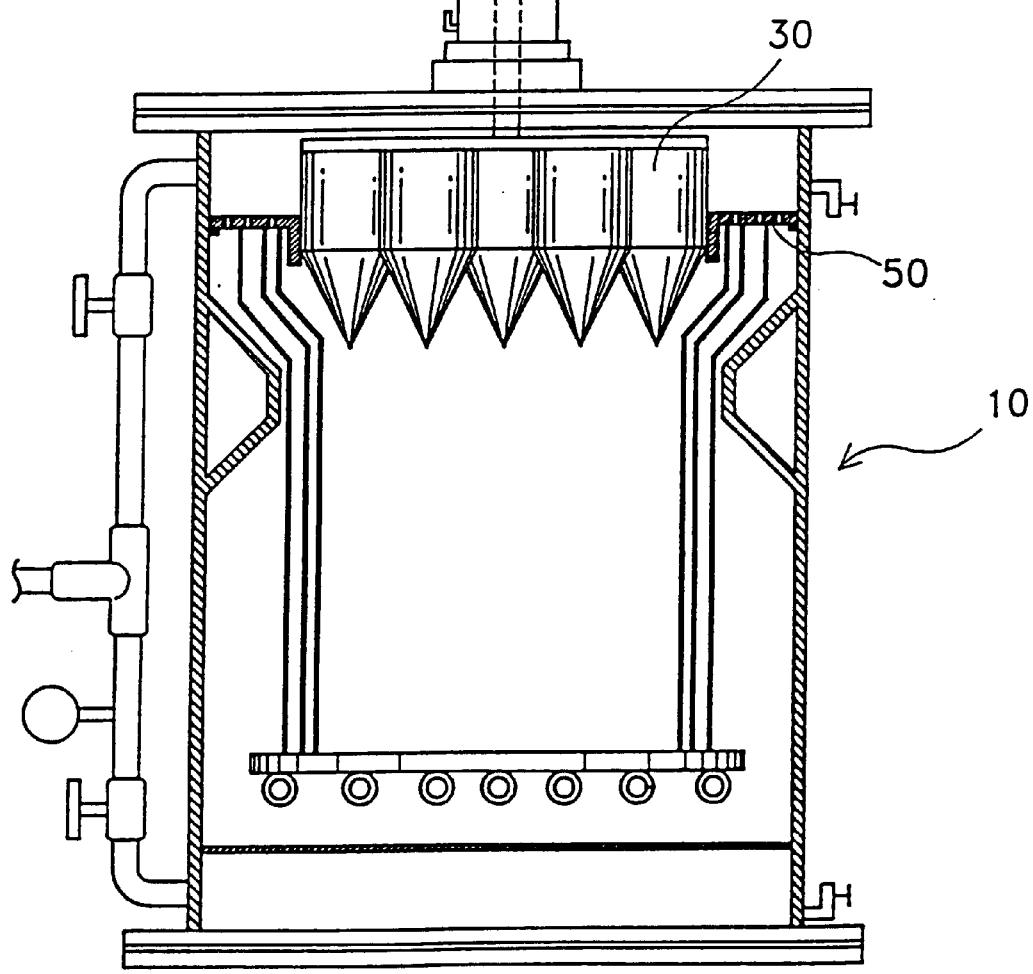
FIG. 4 is a sectional view of an alternate form of the present invention.

FIGS. 4 and 4A show an alternate form of the present invention, in which a number of pressure cones 30 are connected in parallel to the bottom end of the piston rod 32.

It is to be understood that the drawings are designed for purposes of illustration only, and are not intended as a definition and limits of the scope of the invention disclosed.

What the invention claimed is:

1. A liquid filter comprising:

a barrel defining a cylindrical water chamber having a neck, said barrel comprising a top end sealed with a top cover plate, a bottom end sealed with a bottom cover plate, a clean water outlet near the top end, and a raw water inlet near the bottom end;

a pneumatic cylinder securely mounted in a hole on said top cover plate and operated to reciprocate pressure means in and out of the neck of said cylindrical water chamber within said barrel;

a perforated suspension board suspended in said cylindrical water chamber within said barrel above said neck, said perforated suspension board comprising a center through hole through which said pressure means passes into said neck, and a plurality of locating holes spaced around said center through hole;

a filter element formed of bundles of fibers respectively suspended from the locating holes at said perforated suspension board;

a weight board connected to said bundles of fibers and suspended in said cylindrical water chamber within said barrel below said neck; and a fabric filter suspended in said cylindrical water chamber within said barrel below said weight board;

wherein said bundles of fibers are radially squeezed outwards by said pressure means when said pressure means is lowered into said neck, causing the density of said filter element to be increased.

2. The liquid filter of claim 1 wherein said barrel further comprises a reverse wash air input control valve disposed above the elevation of said perforated suspension board for guiding compressed air into said cylindrical water chamber, and a forward wash air input control valve disposed below the elevation of said fabric filter for guiding compressed air into said cylindrical water chamber.

3. The liquid filter of claim 1 wherein said barrel further comprises a first water sealing pad securely sealed between its top end and said top cover plate, and a second sealing pad securely sealed between its bottom end and said bottom cover plate.

4. The liquid filter of claim 1 wherein said barrel further comprises a raw water input control valve for guiding raw water into said cylindrical water chamber below said fabric filter, and a clean water output control valve disposed above the elevation of said perforated suspension board for guiding clean water out of said cylindrical water chamber.

5. The liquid filter of claim 1 wherein said barrel further comprises a reverse wash water input control valve for guiding raw water into said cylindrical water chamber above said perforated suspension board, and a reverse wash water output control valve disposed below said fabric filter for guiding water out of said cylindrical water chamber.

6. The liquid filter of claim 1 wherein said barrel further comprises a forward wash water output control valve for guiding water out of said cylindrical water chamber above said perforated suspension board.

7. The liquid filter of claim 1 wherein said barrel further comprises a pressure gauge installed in said raw water inlet.

* * * * *